United States Patent
Ogihara (10) Patent No.: US 8,758,938 B2
(45) Date of Patent: Jun. 24, 2014

(54) NEGATIVE ELECTRODE FOR LITHIUM SECONDARY BATTERY AND LITHIUM SECONDARY BATTERY

(75) Inventor: Nobuhiro Ogihara, Nagakute (JP)

(73) Assignee: Kabushiki Kaisha Toyota Chuo Kenkyusho, Nagakute-shi (JP)

( * ) Notice: Subject to any disclaimer, the term of this patent is extended or adjusted under 35 U.S.C. 154(b) by 16 days.

(21) Appl. No.: 13/439,377

(22) Filed: Apr. 4, 2012

(65) Prior Publication Data

US 2012/0258360 A1    Oct. 11, 2012

(30) Foreign Application Priority Data

Apr. 8, 2011  (JP) ................................ 2011-086627

(51) Int. Cl.
*H01M 4/13*    (2010.01)
(52) U.S. Cl.
USPC ...................................... 429/218.1; 429/213
(58) Field of Classification Search
CPC ................. H01M 4/13; H01M 4/60
USPC ..................................................... 429/218.1
See application file for complete search history.

(56) References Cited

U.S. PATENT DOCUMENTS

| | | | |
|---|---|---|---|
| 5,529,859 | A | 6/1996 | Shu et al. |
| 7,476,463 | B2 | 1/2009 | Desilvestro et al. |
| 2007/0065719 | A1 | 3/2007 | Timonov et al. |
| 2007/0292760 | A1 | 12/2007 | Patoux et al. |
| 2008/0090149 | A1* | 4/2008 | Sano et al. .................... 429/220 |
| 2010/0233534 | A1 | 9/2010 | Iwama et al. |
| 2011/0287317 | A1* | 11/2011 | Nakanishi .................. 429/218.1 |

FOREIGN PATENT DOCUMENTS

| | | |
|---|---|---|
| JP | A-2004-111374 | 4/2004 |
| JP | A-2004-342605 | 12/2004 |
| JP | A-2007-508709 | 4/2007 |
| JP | A-2008-287976 | 11/2008 |
| JP | A-2009-021229 | 1/2009 |
| JP | A-2009-037868 | 2/2009 |
| JP | A-2009-187940 | 8/2009 |
| JP | A-2010-113870 | 5/2010 |
| JP | A-2010-118320 | 5/2010 |
| WO | WO 2005/036572 A1 | 4/2005 |

OTHER PUBLICATIONS

Banerjee et al. (Cryst. Growth Des. 9 (2009) 2500-2503).*
Tarascon et al. (Nature Materials 8 (2009) 120-125).*
Banerjee et al. (Cryst. Growth Des. 11 (2011) 4704-4720).*
Kaduk (Acta Cryst. B56 (2000) 474-485).*
Jan. 17, 2012 Search Report issued in International Patent Application No. PCT/JP2011/074054 (with translation).

(Continued)

*Primary Examiner* — Ula C Ruddock
*Assistant Examiner* — Lisa S Park Gehrke
(74) *Attorney, Agent, or Firm* — Oliff PLC (57) ABSTRACT

A negative electrode for a lithium secondary battery includes a negative-electrode active material having a specific surface area of Sx ($m^2/g$) and an average particle size of Lx ($\mu m$), a fibrous conductive material having a specific surface area of Sy ($m^2/g$) and an average length of Ly ($\mu m$), and a granular conductive material having a specific surface area of Sz ($m^2/g$) and an average particle size of Lz ($\mu m$), in which letting the negative-electrode active material content be X, letting the fibrous conductive material content be Y, and letting the granular conductive material content be Z, $Log((SyY+SzZ)/SxX\times10^{-1})\times Log((LyY+LzZ)/LxX\times10^{1})$ is defined as an electrode parameter, and the electrode parameter satisfies $Log((SyY+SzZ)/SxX\times10^{-1})\times Log((LyY+LzZ)/LxX\times10^{1}) \geq 0$.

9 Claims, 5 Drawing Sheets

(56) References Cited

OTHER PUBLICATIONS

P.L. Taberna et al., "High rate capabilities $Fe_3O_4$-based Cu nano-architectured electrodes for lithium-ion battery applications," Nature Materials, vol. 5, Jul. 2006, pp. 567-573.

Bing Sun et al., "MnO/C core-shell nanorods as high capacity anode materials for lithium-ion batteries," Journal of Power Sources, vol. 196, 2011, pp. 3346-3349.

Mao-Sung Wu et al., "Electrochemically deposited nanowires of manganese oxide as an anode material for lithium-ion batteries," Electrochemistry Communications, vol. 8, 2006, pp. 383-388.

U.S. Appl. No. 13/814,703 in the name of Ogihara filed Feb. 6, 2013.

U.S. Appl. No. 13/856,776 in the name of Ogihara et al. filed Apr. 4, 2013.

Armand, M. et al., "Conjugated dicarboxylate anodes for Li-ion batteries," Nature Materials, Feb. 2009, vol. 8, pp. 120-125.

Banerjee et al., "Synthesis and Structural Characterization of Lithium-Based Metal-Organic Frameworks," Crystal Growth & Design, vol. 9, pp. 4922-4926, 2009.

Aug. 16, 2013 Office Action issued in U.S. Appl. No. 13/814,703.

Jan. 3, 2014 Office Action issued in U.S. Appl. No. 13/814,703.

\* cited by examiner

NEGATIVE ELECTRODE FOR LITHIUM SECONDARY BATTERY AND LITHIUM SECONDARY BATTERY

CROSS REFERENCE TO RELATED APPLICATIONS

This application claims priority to Japanese Patent Application No. 2011-086627 filed on Apr. 8, 2011, the entire contents of which are incorporated by reference herein.

BACKGROUND OF THE INVENTION

1. Field of the Invention

The present invention relates to a negative electrode for a lithium secondary battery and a lithium secondary battery.

2. Description of the Related Art

In recent years, with the popularization of hybrid automobiles, which can be driven by gasoline energy and electrical energy, and devices that require power supplies, such as uninterruptible power supplies, mobile communication devices, and portable electronic devices, there has been growing demand for rechargeable energy storage devices serving as power supplies having higher performance. Specifically, energy storage devices are required to be excellent in properties, such as output power, capacity, and cycle life.

To realize energy storage devices having such properties, studies on the use of organic compounds as electrode active materials have been conducted. In recent years, organic compounds having conjugated π-electron clouds have been proposed as new active materials which should be charged and discharged rapidly and which can intercalate and deintercalate lithium (for example, see PTLs 1 and 2). Furthermore, a conjugated organic active material containing lithium dicarboxylate having an organic framework composed of dilithium trans-trans-muconate or dilithium terephthalate has been proposed (for example, see NPL 1). The active material is characterized by the conjugated structure of the organic framework. The conjugated structure enables reduction and oxidation (intercalation and deintercalation of lithium) to take place.

CITATION LIST

[Patent Literature]
PTL 1: Japanese Unexamined Patent Application Publication No. 2004-111374
PTL 2: Japanese Unexamined Patent Application Publication No. 2004-342605
[Non Patent Literature]
NPL 1: Nature Materials Vol. 8 120-125 (2009)

SUMMARY OF THE INVENTION

However, in the batteries described in PTLs 1 and 2, the operating potential is in the range of 2.8 V to 3.7 V with respect to lithium metal, which indicates insufficient energy density. In the battery described in NPL 1, the conjugated structure enables lithium to be intercalated and deintercalated. Unfortunately, the charge-discharge capacity is still not sufficient. Thus, the battery is required to have higher levels of charge-discharge characteristics. Nowadays, carbon materials, such as graphite, are used as negative-electrode materials for lithium batteries. However, a reaction that seems to be reductive decomposition of an electrolytic solution can occur at the time of the initial intercalation of lithium. Thus, the initial irreversible capacity is required to be reduced.

The present invention has been accomplished in light of the foregoing problems. It is a main object of the present invention to provide a negative electrode for a lithium secondary battery, the negative electrode being able to enhance the charge-discharge characteristics, and to provide a lithium secondary battery.

To achieve the object described above, the inventors have conducted intensive studies on a negative electrode for a lithium secondary battery and have found the following: An aromatic compound in the form of dicarboxylate anions is used. Lithium is coordinated with oxygen in the carboxylate anions to form a structural body. Furthermore, a fibrous conductive material and a granular conductive material are contained. The sizes and specific surface areas thereof are optimized to increase the charge-discharge characteristics. These findings have led to the completion of the present invention.

A negative electrode for a lithium secondary battery of the present invention comprises: a negative-electrode active material being a layered structural body that includes an organic framework layer and an alkali metal element layer, the organic framework layer containing an aromatic compound that has a structure with two or more aromatic rings, the aromatic compound being in the form of dicarboxylate anions, the alkali metal element layer containing an alkali metal element that is coordinated with oxygen in the carboxylate anions to form a framework, and the negative-electrode active material having a specific surface area of $Sx$ ($m^2/g$) and an average particle size of $Lx$ ($\mu m$); a fibrous conductive material having a specific surface area of $Sy$ ($m^2/g$) and an average length of $Ly$ ($\mu m$); and a granular conductive material having a specific surface area of $Sz$ ($m^2/g$) and an average particle size of $Lz$ ($\mu m$), wherein letting the negative-electrode active material content be X, letting the fibrous conductive material content be Y, and letting the granular conductive material content be Z, $\mathrm{Log}((SyY+SzZ)/SxX\times 10^{-1})\times \mathrm{Log}((LyY+LzZ)/LxX\times 10^{1})$ is defined as an electrode parameter, and the electrode parameter satisfies expression (1):

(Math. 1)

$$\mathrm{Log}((SyY+SzZ)/SxX\times 10^{-1})\times \mathrm{Log}((LyY+LzZ)/LxX\times 10^{1})\geq 0 \qquad \text{expression (1).}$$

The lithium secondary battery of the present invention includes a positive electrode, the foregoing negative electrode for a lithium secondary battery, and an ion-conducting medium that conducts lithium ions.

The negative electrode for a lithium secondary battery and the lithium secondary battery of the present invention can enhance the charge-discharge characteristics. The reason the effect is provided is not clear but is speculated that, for example, the layered structural body composed of the active material has a structure in which the alkali metal element (e.g., lithium) is four-coordinated with oxygen in the dicarboxylate anions; hence, the layered structural body is not easily dissolved in a nonaqueous electrolytic solution, so that the crystal structure is maintained to enhance the stability of the charge-discharge cycle characteristics. The layered structural body is not conductive. The fibrous conductive material and the granular conductive material are contained in the negative electrode. For example, the fibrous conductive material provides an electron-conducting function, and the granular conductive material provides an electron-collecting function, thereby increasing the initial discharge capacity. Furthermore, in the case where the electrode parameter satisfies expression (1), for example, the decomposition of the ion-conducting medium can be further inhibited, the occurrence of the initial irreversible capacity can be reduced, and the charge-discharge characteristics can be enhanced.

DETAILED DESCRIPTION OF THE INVENTION

A lithium secondary battery of the present invention includes a positive electrode containing a positive-electrode active material that intercalates and deintercalates lithium, a negative electrode containing a negative-electrode active material that intercalates and deintercalates lithium, and an ion-conducting medium provided between the positive electrode and the negative electrode, the ion-conducting medium conducting lithium ions. The lithium secondary battery of the present invention includes the negative electrode having a layered structural body, the layered structural body being composed of the negative-electrode active material. The layered structural body in the present invention includes an organic framework layer that contains an aromatic compound having a structure with two or more aromatic rings, the aromatic compound being in the form of dicarboxylate anions, and an alkali metal element layer where an alkali metal element is coordinated with oxygen in the carboxylate anions to form a framework. The layered structural body in the present invention is preferably composed of the negative-electrode active material. Furthermore, the alkali metal contained in the alkali metal element layer may be one or more of Li, Na, K, and so forth and is preferably Li. Moreover, an alkali metal intercalated and deintercalated by charging and discharging may be the same or different from the alkali metal element in the alkali metal element layer may be one or more of Li, Na, K, and so forth. Hereinafter, a layered structural body having the alkali metal element layer containing Li will be mainly described.

Figure 1:
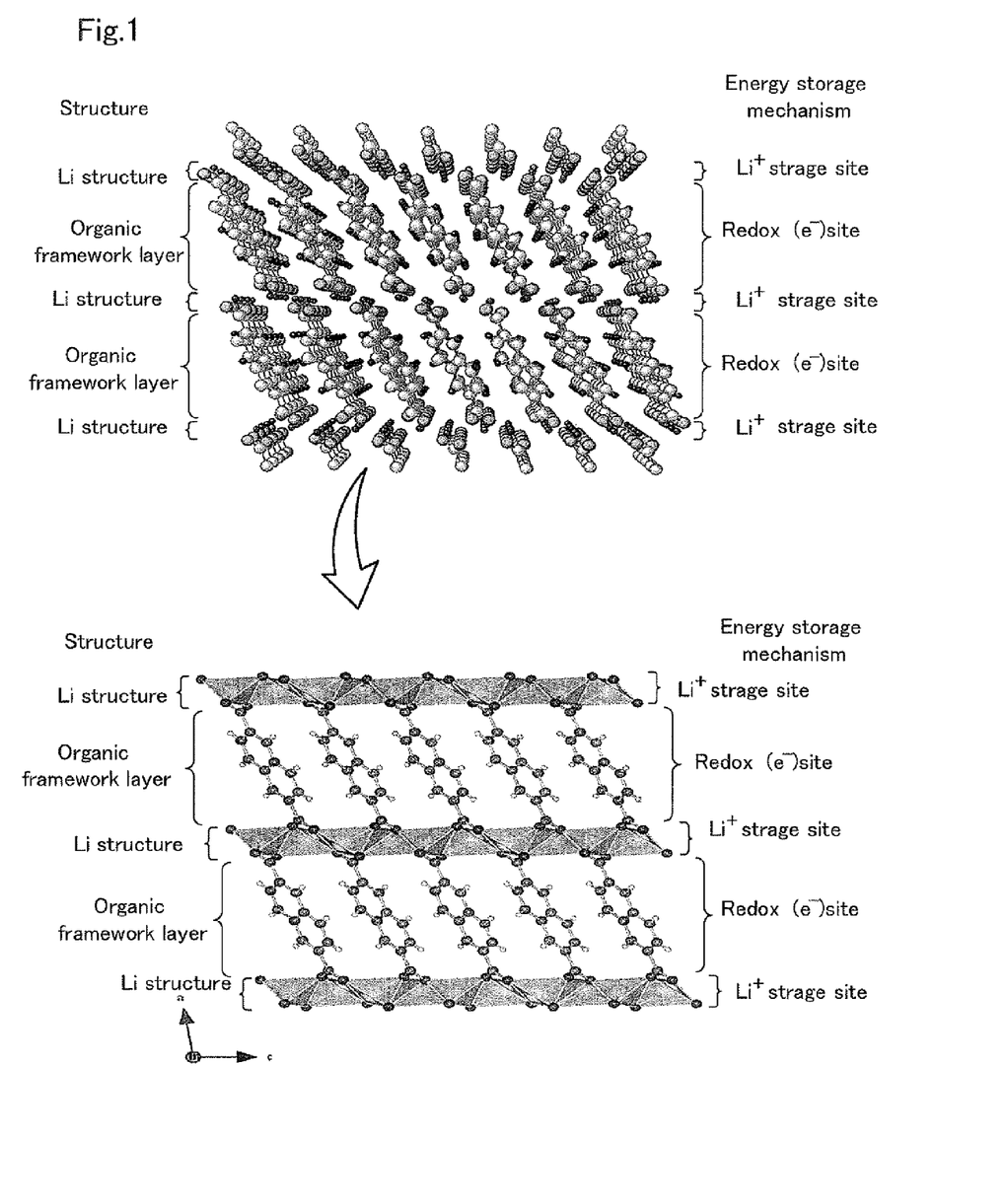
FIG. 1 is an explanatory drawing illustrating an example of a structure of a layered structural body in the present invention.

The negative electrode of the present invention includes the layered structural body serving as the negative-electrode active material. FIG. 1 is an explanatory drawing illustrating an example of a structure of a layered structural body in the present invention. The layered structural body includes organic framework layers and alkali metal element layers. The layered structural body which is formed by the π-electron interaction of the aromatic compound and which has a monoclinic crystal structure assigned to space group P2$_1$/c is preferred because of its structural stability. Furthermore, the layered structural body preferably has a structure in which an alkali metal element is four-coordinated with four oxygen atoms of different dicarboxylate anions because of its structural stability, the structure being represented by chemical formula (1). In chemical formula (1), R's each represents a structure having two or more aromatic rings, in which two or more of plural R's may be the same, one or more of R's may be different, and A represents an alkali metal element. As described above, the structure in which the organic framework layers are linked with the alkali metal element is preferred.

[Chem. 1]

Chemical formula (1)

wherein R's each represents a structure with two or more aromatic rings, two or more of R's may be the same, and one or more of R's may be different; and A represents an alkali metal element.

Each of the organic framework layers contains the aromatic compound serving as dicarboxylate anions, the aromatic compound having the structure with two or more aromatic rings. The structure with two or more aromatic rings may be a polycyclic aromatic compound, such as biphenyl, in which two or more aromatic rings are linked together, or a fused polycyclic compound, such as naphthalene, anthracene, or pyrene, in which two or more aromatic rings are fused together. Each of the aromatic rings may be a five-membered ring, a six-membered ring, or an eight-membered ring, and is preferably a six-membered ring. The number of the aromatic rings is preferably in the range of 2 to 5. When the number of the aromatic rings is two or more, the layered structural body is easily formed. When the number of the aromatic rings is five or less, it is possible to further increase the energy density. Each organic framework layer preferably contains an aromatic compound in which one of the dicarboxylate anions and the other are bonded in diagonal positions of the aromatic ring structure. In this case, the layered structural body including the organic framework layer and the alkali metal element layer is easily formed. The diagonal positions where the carboxylate anions are bonded may be positions such that the distance from a binding position of one of the carboxylate anions to a binding position of the other is maximized. For example, when the aromatic ring structure is naphthalene, the 2- and 6-positions are exemplified. When the aromatic ring structure is pyrene, the 2- and 7-positions are exemplified. Each organic framework layer may be composed of an aromatic compound having a structure represented by chemical formula (2), wherein R may represent the structure having two or more aromatic rings. Specifically, the organic framework layer may contain one or more aromatic compounds represented by chemical formulae (3) to (5), wherein in chemical formulae (3) to (5), n preferably represents an integer of 2 to 5, and m preferably represents an integer of 0 to 3. When n represents an integer of 2 to 5, the organic framework layer has an appropriate size. This results in an increase in charge-discharge capacity. When m represents an integer of 0 to 3, the organic framework layer has an appropriate size. This results in an increase in charge-discharge capacity. In each of chemical formulae (3) to (5), the aromatic compound may have a substituent or a heteroatom in its structure. Specifically, the aromatic compound may have a substituent, for example, a halogen, a chain or cyclic alkyl group, an aryl group, an alkenyl group, an alkoxy group, an aryloxy group, a sulfonyl group, an amino group, a cyano group, a carbonyl group, an acyl group, an amide group, or a hydroxy group, in place of hydrogen of the aromatic compound. Furthermore, the aromatic compound may have a structure in which nitrogen, sulfur, or oxygen is introduced in place of carbon of the aromatic compound.

[Chem. 2]

Chemical formula (2)

wherein R represents a structure having two or more aromatic rings.

[Chem. 3]

Chemical formula (3)

Chemical formula (4)

Chemical formula (5)

wherein n represents an integer of 2 to 5; m represents an integer of 0 to 3; and each of the aromatic compounds may have a substituent or a heteroatom in its structure.

As illustrated in FIG. 1, the framework of each of the alkali metal element layers is formed by the coordination of the alkali metal element with oxygen contained in the carboxylate anions. The alkali metal element may be one or more of Li, Na, and K and is preferably Li. The alkali element contained in each alkali metal element layer forms the framework of the layered structural body and does not seem to be associated with ion transfer due to charging and discharging. As illustrated in FIG. 1, the layered structural body is formed of the organic framework layers and Li layers (alkali metal element layers) provided between the organic framework layers. With respect to an energy storage mechanism, the organic framework layers of the layered structural body can function as redox ($e^-$) sites, and the Li layers can function as sites that store $Li^+$. That is, the layered structural body can store and release energy as illustrated in chemical formula (6). Furthermore, in the layered structural body, the organic framework layers have spaces where Li can enter. It is thus speculated that the layered structural body can store and release Li in portions other than the alkali metal element layers illustrated in chemical formula (6), thereby further enhancing the charge-discharge capacity.

[Chem. 4]

Chemical formula (6)

The negative electrode of the lithium secondary battery according to the present invention contains, for example, the negative-electrode active material being the layered structural body, a fibrous conductive material, and a granular conductive material. The negative electrode may be formed by, for example, mixing the negative-electrode active material having the layered structural body, the fibrous conductive material, the granular conductive material, and a binder material together, adding an appropriate solvent thereto to form a paste-like negative electrode mixture, applying and drying the mixture to the surface of a collector, and, optionally, performing compression in order to increase the electrode density. The fibrous conductive material and the granular conductive material are not particularly limited as long as they are electron-conducting materials that do not affect the battery performance of the negative electrode. Examples of the fibrous conductive material include carbon fibers, activated carbon fibers, conductive polymer fibers, and metal fibers (e.g., copper, nickel, aluminum, silver, and gold fibers). Examples of the granular conductive material include graphites, such as natural graphites (e.g., scaly graphite and flake graphite) and artificial graphites, acetylene black, carbon black, Ketjen black, carbon whiskers, needle coke, and metals (e.g., copper, nickel, aluminum, silver, and gold). The binder material serves to retain particles of the active material and particles of the conductive materials. Examples thereof include fluorine-containing resins, such as polytetrafluoroethylene (PTFE), polyvinylidene fluoride (PVDF), and fluoro-rubber; thermoplastic resins, such as polypropylene and polyethylene; ethylene-propylene-diene monomers (EPDMs); sulfonated EPDMs; and natural butyl rubber (NBR). They may be used separately or in combination as a mixture of two or more. Furthermore, an aqueous dispersion of a cellulose-based material and an aqueous dispersion of styrene-butadiene rubber (SBR), which serve as aqueous binders, may also be used. Examples of a usable solvent in which the negative-electrode active material, the conductive materials, and the binder material are dispersed include organic solvents, such as N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. Alternatively, a dispersant, a thickener, and so forth may be added to water, and the active material may be formed into a slurry with a latex, such as SBR. Examples of the thickener include polysaccharides, such as carboxymethyl cellulose and methylcellulose. They may be used separately or in combination as a mixture of two or more. Examples of an application method include roller coating with an applicator roll or the like; screen coating; a doctor blade method; spin coating, and bar coating. A given thickness and shape can be obtained by any of these methods. Examples of a material for the collector include copper, nickel, stainless steel, titanium, aluminum, baked carbon, conductive polymers, conductive glass, and Al—Cd alloys. Furthermore, in order to improve adhesiveness, conductivity, and resistance to reduction, a collector in which, for example, a copper surface is treated with carbon, nickel, titanium, silver, or the like may be used. They may be subjected to surface oxidation treatment. The collector may be in the form of foil, a film, a sheet, a net, a punched or expanded body, a lath body, a porous body, a foam, or a formed article of fibers. The collector having a thickness of, for example, 1 to 500 μm is used.

In the case where the negative electrode of the lithium secondary battery according to the present invention includes the negative-electrode active material having the layered structural body with a specific surface area of $Sx$ ($m^2/g$) and an average particle size of $Lx$ (μm), the fibrous conductive material with a specific surface area of $Sy$ ($m^2/g$) and an average length of $Ly$ (μm), and the granular conductive material with a specific surface area of $Sz$ ($m^2/g$) and an average particle size of $Lz$ (μm), letting the negative-electrode active material content be X, letting the fibrous conductive material content be Y, and letting the granular conductive material content be Z, $\mathrm{Log}((SyY+SzZ)/SxX\times 10^{-1})\times \mathrm{Log}((LyY+LzZ)/LxX\times 10^{1})$ is defined as an electrode parameter, and the electrode parameter satisfies expression (1). In the electrode parameter in expression (1), the term $\mathrm{Log}((SyY+SzZ)/SxX\times 10^{-1})$ indicates the proportion S of the specific surface areas of the conductive materials with respect to the specific surface area of the negative-electrode active material (expression (2)). The proportion S of the specific surface areas indicates that many faces are present with respect to the active material and indicates the function of collecting electrons. Note that "$10^{-1}$" indicates the degree of contribution in the electrode parameter. In expression (1) of the electrode parameter, the term $\mathrm{Log}((LyY+LzZ)/LxX\times 10^{1})$ indicates the proportion L of the average lengths of the conductive materials with respect to the particle size of the negative-electrode active material (expression (3)). The proportion L of the average lengths indicates that a longer conductive path is formed in the electrode and indicates the function of conducting electrons. Note that "$10^{1}$" indicates the degree of contribution in the electrode parameter. That is, the degree of contribution of the proportion L of the average lengths is high compared with the proportion S of the specific surface areas. In the case where expression (1) is satisfied, the negative electrode has a good balance between the electron collecting properties and electron conducting properties and enhances the initial properties, such as the initial discharge capacity and the initial charge-discharge efficiency, of the lithium secondary battery. The electrode parameter is zero or more. The electrode parameter is preferably 1 or less and more preferably in the range of 0.3 to 0.8.

(Math. 1)

$$\mathrm{Log}((SyY+SzZ)/SxX\times 10^{-1})\times \mathrm{Log}((LyY+LzZ)/LxX\times 10^{1})\geq 0 \qquad \text{expression (1)}$$

(Math. 2)

$$S=\mathrm{Log}((SyY+SzZ)/SxX\times 10^{-1}) \qquad \text{expression (2)}$$

(Math. 3)

$$L=\mathrm{Log}((LyY+LzZ)/LxX\times 10^{1}) \qquad \text{expression (3)}$$

The proportion X of the negative-electrode active material having the layered structural body is preferably in the range of 50 parts by mass to 80 parts by mass with respect to 100 parts by mass of the whole negative electrode mixture. A proportion X of 50 parts by mass or more results in a higher charge-discharge capacity. At a proportion of X of 80 parts by mass or less, sufficient amounts of the conductive materials are present, thus easily ensuring the conductivity. The layered structural body of the negative-electrode active material preferably has a specific surface area $Sx$ of $0.1\ m^2/g$ to $10\ m^2/g$ and more preferably $0.5\ m^2/g$ to $5\ m^2/g$. A specific surface area $Sx$ of $0.1\ m^2/g$ or more results in higher contact properties with the ion-conducting medium. A specific surface area $Sx$ of $10\ m^2/g$ or less results in inhibition of the decomposition of the ion-conducting medium. The layered structural body of the negative-electrode active material preferably has an average particle size $Lx$ of 0.5 μm to 20 μm and more preferably 1 μm to 5 μm. An average particle size $Lx$ of 0.5 μm or more results in an increase in battery capacity because many stacked portions of the layered structural body are present. An average particle size $Lx$ of 20 μm or less results in suitable lithium intercalation-deintercalation properties. Here, the "specific surface area" is based on the result of BET measurement using nitrogen adsorption. The average particle size is defined as the average size of the particles of the layered structural body in an image observed with an electron microscope (SEM).

The proportion Y of the fibrous conductive material in the negative electrode is preferably in the range of 5 parts by mass to 15 parts by mass with respect to 100 parts by mass of the whole negative electrode mixture. At a proportion Y of 5 parts by mass or more, the conductive path is easily ensured. At a proportion Y of 15 parts by mass or less, the amount of the negative-electrode active material is ensured to increase the charge-discharge capacity. The fibrous conductive material preferably has a specific surface area $Sy$ of $1\ m^2/g$ to $100\ m^2/g$ and more preferably $5\ m^2/g$ to $50\ m^2/g$. A specific surface area $Sy$ of $1\ m^2/g$ or more results in enhanced collection properties. A specific surface area $Sy$ of $100\ m^2/g$ or less results in enhanced conductivity. The fibrous conductive material preferably has an average length $Ly$ of 5 μm to 100 μm and more preferably 10 μm to 50 μm. An average length $Ly$ of 5 μm or more results in enhanced conductivity. An average length $Ly$ of 100 μm or less results in enhanced collection properties.

The proportion Z of the granular conductive material in the negative electrode is preferably in the range of 5 parts by mass to 15 parts by mass with respect to 100 parts by mass of the whole negative electrode mixture. At a proportion Z of 5 parts by mass or more, the collection properties are easily ensured. At a proportion Z of 15 parts by mass or less, the amount of the negative-electrode active material is ensured to increase the charge-discharge capacity. The granular conductive material preferably has a specific surface area Sz of 10 m$^2$/g to 500 m$^2$/g and more preferably 50 m$^2$/g to 250 m$^2$/g. A specific surface area Sz of 10 m$^2$/g or more results in enhanced collection properties. A specific surface area Sz of 500 m$^2$/g or less results in enhanced conductivity. The granular conductive material preferably has an average particle size Lz of 0.005 μm to 5 μm and more preferably 0.010 μm to 1 μm. An average particle size Lz of 0.005 μm or more results in enhanced collection properties. An average particle size Lz of 5 μm or less results in inhibition of the decomposition of the ion-conducting medium.

The proportion of the binder material may be, for example, (100-X-Y-Z) parts by mass and is preferably in the range of 5 parts by mass to 15 parts by mass with respect to 100 parts by mass of the whole negative electrode mixture. This enhances the binding properties of the negative electrode mixture and the charge-discharge capacity.

The positive electrode of the lithium secondary battery according to the present invention may be formed by, for example, mixing the positive-electrode active material, a conductive material, and a binder material, adding an appropriate solvent thereto to form a paste-like positive electrode mixture, applying and drying the mixture to the surface of a collector, and, optionally, performing compression in order to increase the electrode density. Examples of a material that may be used as the positive-electrode active material include transition metal element-containing sulfides; and oxides containing lithium and transition metal elements. Specific examples thereof include transition metal sulfides, such as $TiS_2$, $TiS_3$, $MoS_3$, and $FeS_2$; lithium manganese composite oxides, such as $Li_{(1-x)}MnO_2$ (e.g., 0<x<1, the same is true hereinafter) and $Li_{(1-x)}Mn_2O_4$; lithium cobalt composite oxides, such as $Li_{(1-x)}CoO_2$; lithium nickel composite oxides, such as $Li_{1-x}NiO_2$; lithium vanadium composite oxides, such as $LiV_2O_3$; and transition metal oxides, such as $V_2O_5$. Among these compounds, lithium-transition metal composite oxides, such as $LiCoO_2$, $LiNiO_2$, $LiMnO_2$, and $LiV_2O_3$, are preferred. The conductive material, the binder material, the solvent, and so forth used for the positive electrode may be the same as those exemplified for the negative electrode. Examples of a material for the collector of the positive electrode include aluminum, titanium, stainless steel, nickel, iron, baked carbon, conductive polymers, and conductive glass. Furthermore, in order to improve adhesiveness, conductivity, and oxidation resistance, a collector in which the surface of aluminum, copper, or the like is treated with carbon, nickel, titanium, silver, or the like may be used. They may be subjected to surface oxidation treatment. The collector may have the same shape as that of the negative electrode.

As the ion conductive medium of the lithium secondary battery of the present invention, for example, a nonaqueous electrolyte or a nonaqueous gel electrolyte, each containing a supporting salt, may be used. As a solvent of the nonaqueous electrolyte, for example, carbonates, esters, ethers, nitriles, furans, sulfolanes, and dioxolanes may be mentioned, and those mentioned above may be used alone or in combination in the form of a mixture. In particular, for example, carbonates including cyclic carbonates, such as ethylene carbonate, propylene carbonate, vinylene carbonate, butylene carbonate, and chloroethylene carbonate, and chain carbonates, such as dimethyl carbonate, ethyl methyl carbonate, diethyl carbonate, ethyl-n-butyl carbonate, methyl-t-butyl carbonate, di-1-propyl carbonate, and t-butyl-1-propyl carbonate; cyclic esters, such as γ-butyrolactone and γ-valerolactone; chain esters, such as methyl formate, methyl acetate, ethyl acetate, and methyl butyrate; ethers, such as dimethoxyethane, ethoxymethoxyethane and diethoxyethane; nitriles, such as acetonitrile and benzonitrile; furans, such as tetrahydrofuran and methyltetrahydrofuran; sulfolanes, such as sulfolane and tetramethyl sulfolane; and dioxolanes, such as 1,3-dioxolane and methyl dioxolane, may be mentioned. Among those mentioned above, a combination between a cyclic carbonate and a chain carbonate is preferable. According to the combination described above, cycle characteristics showing the battery performance by repetition of charge and discharge is not only excellent, but also the viscosity of the electrolyte, the capacity of an obtained battery, the battery output, and the like can be well combined with each other. In addition, the reason for this is believed that a cyclic carbonate has a comparatively high relative dielectric constant and increases the dielectric constant of the electrolyte and that a chain carbonate suppresses an increase in viscosity of the electrolyte.

As the supporting salt contained in the lithium secondary battery of the present invention, for example, $LiPF_6$, $LiBF_4$, $LiAsF_6$, $LiCF_3SO_3$, $LiN(CF_3SO_2)_2LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$ may be mentioned. Among those mentioned above, in view of electric properties, inorganic salts, such as $LiPF_6$, $LiBF_4$, $LiAsF_6$, and $LiClO_4$, and organic salts, such as $LiCF_3SO_3$, $LiN(CF_3SO_2)_2$, and $LiC(CF_3SO_2)_3$ are preferably used alone or in combination. This electrolyte salt preferably has a concentration in a range of 0.1 to 5 mol/L in the nonaqueous electrolyte and more preferably in a range of 0.5 to 2 mol/L. When the concentration of the electrolyte salt is 0.1 mol/L or more, a sufficient current density can be obtained, and when the concentration is 5 mol/L or less, the electrolyte can be further stabilized. In addition, for example, a phosphorus-based and/or a halogen-based flame retardant may also be added to this nonaqueous electrolyte.

In addition, a solid ion conductive polymer may also be used as the ion conductive medium instead of using a liquid ion conductive medium. As the ion conductive polymer, for example, a polymer gel including a supporting salt and a polymer formed from a monomer, such as acrylonitrile, ethylene oxide, propylene oxide, methyl methacrylate, vinyl acetate, vinyl pyrrolidone, or vinylidene fluoride may be used. Furthermore, an ion conductive polymer and a nonaqueous electrolyte may also be used in combination. In addition, as the ion conductive medium, besides the ion conductive polymer, for example, an inorganic solid electrolyte, a mixed material of an inorganic solid electrolyte and an organic polymer electrolyte, or an inorganic solid powder bound by an organic binder may also be used.

The lithium secondary battery of the present invention may include at least one separator between the positive electrode and the negative electrode. Although the separator is not particularly limited as long as having a composition usable under working conditions of the lithium secondary battery, for example, polymer nonwoven cloths, such as a polypropylene nonwoven cloth and a polyphenylene sulfide nonwoven cloth, and thin microporous films of olefin resins, such as a polyethylene and a polypropylene, may be mentioned. These mentioned above may be used alone or in combination.

Figure 2:
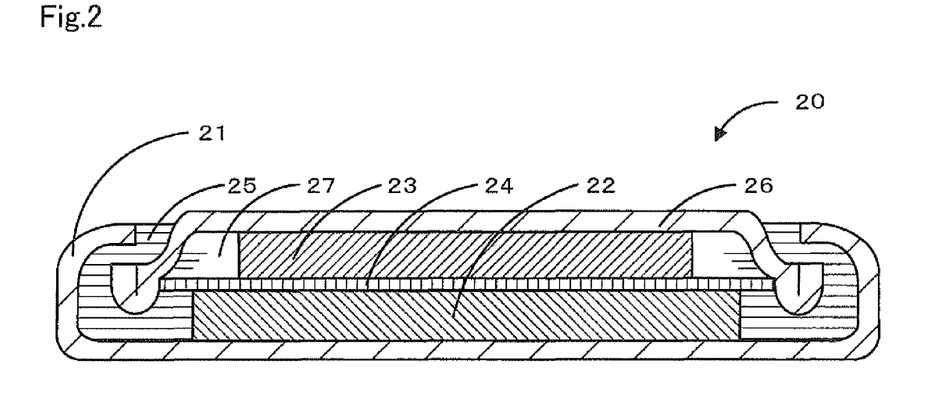
FIG. 2 is a schematic view illustrating an example of a lithium secondary battery of the present invention.

The shape of the lithium secondary battery according to the present invention is not particularly limited. Examples thereof include coin shapes, button shapes, sheet shapes, laminate shapes, cylindrical shapes, flat shapes, and angular shapes. The lithium secondary battery may have a large shape for use in electric cars and the like. FIG. 2 is a schematic view illustrating an example of a lithium secondary battery 20 of the present invention. The lithium secondary battery 20 includes a cup-shaped battery case 21, a positive electrode containing a positive-electrode active material and arranged below the battery case 21, a negative electrode 23 containing a negative-electrode active material and located opposite a positive electrode 22 with a separator 24, a gasket 25 composed of an insulating material, and a sealing plate 26 arranged in the opening portion of the battery case 21 and sealing the battery case 21 using the gasket 25. In the lithium secondary battery 20, a space between the positive electrode 22 and the negative electrode 23 is filled with an ion-conducting medium 27 in which a lithium salt is dissolved. The negative electrode 23 has a layered structural body composed of a negative-electrode active material. The layered structural body includes an organic framework layer and an alkali metal element layer. The organic framework layer contains an aromatic compound having a structure with two or more aromatic rings, the aromatic compound being in the form of dicarboxylate anions, and one of the dicarboxylate anions and the other being bonded in diagonal positions of the aromatic compound. The alkali metal element layer contains an alkali metal element which is coordinated with oxygen in the carboxylate anions. The negative electrode 23 contains the layered structural body, a fibrous conductive material, a granular conductive material, and a binder material and satisfies expression (1).

For the layered structural body composed of the negative-electrode active material in the lithium secondary battery of the present invention, the lithium element is four-coordinated with oxygen atoms of the dicarboxylate anions. It is thus speculated that the layered structural body is not easily dissolved in a nonaqueous medium and maintains the crystal structure to enhance the stability of the charge-discharge cycle characteristics. In the layered structural body, it is speculated that the organic framework layer functions as a redox site and that the Li layer functions as a Li ion-intercalating site. The charge-discharge potential of the negative electrode is in the range of 0.5 V to 1.0 V with respect to lithium metal, thus resulting in the suppression of a significant reduction in energy density due to a reduction in the operating voltage of the battery and resulting in the suppression of the deposition of lithium metal. The novel layered structural body (crystalline organic-inorganic composite material) may enhance the charge-discharge characteristics. Furthermore, while the layered structural body in the negative electrode has low conductivity, the layered structural body satisfies expression (1) (electrode parameter). Thus, the negative electrode has a good balance between the electron collecting properties and electron conducting properties and enhances the initial properties, such as the initial discharge capacity and the initial charge-discharge efficiency, of the lithium secondary battery.

The present invention is not limited to the foregoing embodiments. It will be obvious that various modifications may be made within the technical scope of the present invention.

For example, while the lithium secondary battery has been described in the foregoing embodiments, the present invention may be applied to a negative electrode for use in a lithium secondary battery.

EXAMPLES

Specific production examples of lithium secondary batteries of the present invention will be described below. First, the results of studies on the properties of a layered structural body will be described in experimental examples.

Experimental Examples 1 and 2

Lithium 2,6-naphthalenedicarboxylate (see chemical formula (7)) was synthesized as a layered structural body. For lithium 2,6-naphthalenedicarboxylate, 2,6-naphthalenedicarboxylic acid and lithium hydroxide monohydrate (LiOH.H$_2$O) were used as starting materials. First, 100 mL of methanol was added to 0.556 g of lithium hydroxide monohydrate, and the resulting mixture was stirred. After lithium hydroxide monohydrate was dissolved, 1.0 g of 2,6-naphthalenedicarboxylic acid was added thereto. The mixture was stirred for 1 hour. The solvent was removed after the stirring. Drying was performed at 150° C. for 16 hours under vacuum to give a white powder sample. The resulting white powder sample was defined as an active material powder in Experimental Example 1. The BET measurement of the active material powder in Experimental Example 1 using nitrogen adsorption revealed that the specific surface area was 1.0 m$^2$/g. The average particle size was determined by observing the sample with an electron microscope (SEM), measuring the size of particles in an image, and averaging the resulting values and was found to be 2.5 μl. Lithium 4,4'-biphenyldicaroxylate (see chemical formula (8)) was synthesized through the same steps as those in Experimental Example 1. The resulting white powder sample was defined as an active material powder in Experimental Example 2.

[Chem. 5]

Chemical formula (7)

[Chem. 6]

Chemical formula (8)

Experimental Example 3 and 4

Lithium terephthalate (see chemical formula (9)) was used as an active material powder in Experimental Example 3. Lithium 2,3-naphthalenedicarboxylate (see chemical formula (10)) was used as an active material powder in Experimental Example 4.

[Chem. 7]

Chemical formula (9)

[Chem. 8]

Chemical formula (10)

[Production of Coated Electrode]

Electrodes for lithium secondary batteries were produced using the active material powders prepared in Experimental Examples 1 to 4. First, 60% by mass of each of the active material powders, 30% by mass of carbon black serving as a conductive material, and 10% by mass of polyvinylidene fluoride serving as a binder material were mixed together. An appropriate amount of N-methyl-2-pyrrolidone serving as a dispersant was added and dispersed therein, resulting in slurry-like mixtures. Each of the slurry-like mixtures was uniformly applied to a copper foil collector having a thickness of 10 μm and dried by heating to form coated sheets. The coated sheets were then pressed and punched to prepare disk-like electrodes each having an area of 2.05 $cm^2$.

[Production of Two-Electrode Evaluation Cell]

Lithium hexafluorophosphate was added to a nonaqueous mixed solvent of 30:40:30 (by volume) ethylene carbonate/dimethyl carbonate/ethyl methyl carbonate in such a manner that the concentration of lithium hexafluorophosphate was 1 mol/L, thereby preparing a nonaqueous electrolytic solution. Each of the foregoing electrodes was used as a working electrode. Lithium metal foil (thickness: 300 μm) was used as a counter electrode. A separator (manufactured by Tonen Tapyrus Co., Ltd.) impregnated with the nonaqueous electrolytic solution was interposed between the electrodes to produce a two-electrode evaluation cell. The resulting cells were defined as two-electrode evaluation cells in Experimental Examples 1 to 4.

(X-Ray Diffraction Measurement)

Figure 3:
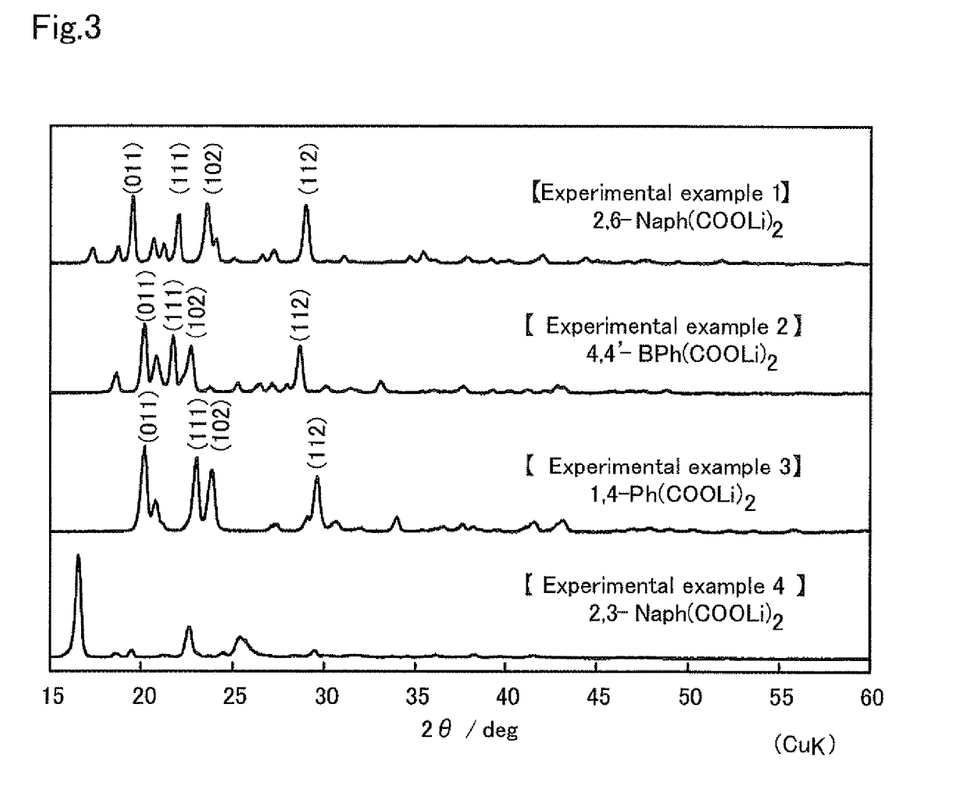
FIG. 3 illustrates the results of X-ray diffraction measurement in Experimental Examples 1 to 4.

Powder X-ray diffraction measurement of the active material powders in Experimental Examples 1 to 4 was performed. The measurement was performed with an X-ray diffractometer (RINT 2200, manufactured by Rigaku Corporation) using CuKα, radiation (wavelength: 1.54051 Å). The X-ray was monochromated with a single-crystal graphite monochromator. The measurement was performed at an applied voltage of 40 kV, a current of 30 mA, a scan rate of 4°/min, and an angle range (2θ) of 10° to 90°. FIG. 3 illustrates the results of X-ray diffraction measurement in Experimental Examples 1 to 4. As illustrated in FIG. 3, in each of Experimental Examples 1 to 3, assuming that a monoclinic crystal assigned to space group $P2_1/c$ was formed, (011), (111), (102), and (112) peaks were clearly observed. Thus, the layered structural body including the lithium layers and the organic framework layers illustrated in FIG. 1 was probably formed. It was also speculated that in each of Experimental Examples 1 to 3, because of the monoclinic crystal assigned to space group $P2_1/c$, a structure in which lithium was four-coordinated with four oxygen atoms of different aromatic dicarboxylic acids was formed and that conjugated π-electron clouds interact with each other in organic framework portions. Meanwhile, in Experimental Example 4, the bonding positions of the dicarboxylate anions are less likely to lead to the formation of an alkali metal element layer because of its structure, and no peak assigned to space group $P2_1/c$ was observed. This clearly indicated that the structure was different from the foregoing structure.

(Simultaneous Differential Thermal/Thermogravimetric Measurement)

Figure 4:
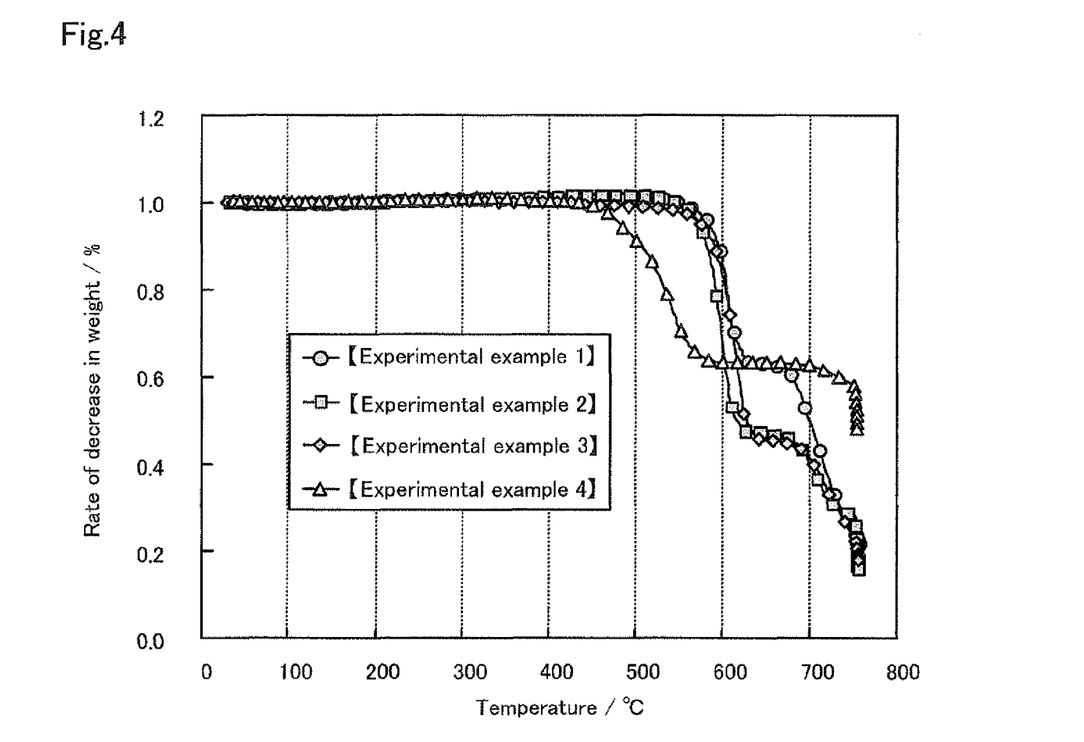
FIG. 4 illustrates the results of simultaneous differential thermal/thermogravimetric measurement in Experimental Examples 1 to 4.

Simultaneous differential thermal/thermogravimetric measurement of the active material powders in Experimental Examples 1 to 4 was performed. The measurement was performed with a simultaneous differential thermal/thermogravimetric measurement system (Thermo Mass, manufactured by Rigaku Corporation). The measurement was performed at a measurement temperature range of room temperature to 750° C. and a rate of temperature increase of 10° C./min. FIG. 4 illustrates the results of the simultaneous differential thermal/thermogravimetric measurement in Experimental Examples 1 to 4. For the material in Experimental. Example 4, a decrease in mass occurs at about 450° C. In contrast, in each of Experimental Examples 1 to 3, a decrease in mass occurs at 550° C., which indicates improvement in thermal stability. The reason for this is presumably that an the crystal structure of the monoclinic crystal assigned to space group $P2_1/c$ in Experimental Examples 1 to 3, crystals having excellent thermal stability are formed because of organization by π-electron interaction and the structure in which lithium is four-coordinated with four oxygen atoms of different aromatic dicarboxylic acids.

(Charge-Discharge Test)

At 20° C., each of the two-electrode evaluation cells produced in Experimental Examples 1 to 4 was reduced (charged) to 0.5 V at 0.02 mA and then oxidized (discharged) to 3.0 V at 0.02 mA. In the charge-discharge operation, the first reduction capacity was defined as $Q(1st)_{red}$, and the first oxidation capacity was defined as $Q(1st)_{oxi}$. Table 1 summarizes the results of the charge-discharge test of the two-electrode evaluation cells produced in Experimental Examples 1 to 4. The results illustrated in Table 1 demonstrated that each of the cells produced in Experimental Examples 1 and 2 had a large oxidation capacity compared with Experimental Example 3. For example, in Experimental Example 2, the cell had a higher capacity than the theoretical capacity, i.e., 200 mAh/g. The reason for this is presumably that lithium was also intercalated and deintercalated in the spaces in the organic framework layers. Furthermore, each of the cells produced in Experimental Examples 1 and 2 had a plateau region, i.e., a constant potential portion. In contrast, the cell produced in Experimental Example 4 did not have a clear plateau region. It was thus speculated that in each of Experimental Examples 1 and 2, the layered structural body including the lithium layers and the organic framework layers provided a constant potential of 0.7 V to 0.85 V with respect to lithium metal. In Experimental Example 3, the charge-discharge capacity was lower than those in Experimental Examples 1 and 2. This seemed to be attributed to the fact that, for example, the compound had only a single aromatic ring and low conductivity. In the case where a compound has only a single aromatic ring, it is speculated that the π-electron interaction of the aromatic ring is reduced by a small change in volume when lithium is intercalated; hence, the reduced overlap of π-electrons reduces the conductivity, thus reducing the charge-discharge capacity. Meanwhile, in the case where a compound has two or more aromatic rings, it is speculated that even if the volume is changed when lithium is intercalated, sufficient overlap of π-electrons provides stable conductivity, so that the charge-discharge capacity is not reduced. A large number of aromatic rings lead to excessively large organic framework layers compared with the lithium-intercalating sites. Thus, the number of aromatic rings may be preferably in the range of about 2 to about 5. The potential in the plateau region in each of Experimental Examples 1 and 2 is lower than that in Experimental Example 3. This should provide a design for a high-voltage battery. In each of Experimental Examples 1 and 2, the plateau region is in the range of 0.7 V to 0.85 V with respect to lithium metal. For example, the potential with respect to lithium metal is high compared with graphite serving as a negative-electrode active material, thereby suppressing the deposition of metallic lithium on the negative electrode. Furthermore, in each of Experimental Examples 1 and 2, the potential with respect to lithium metal is lower than 1.5 V, which is the potential of a composite oxide (e.g., a lithium titanium composite oxide). Thus, the battery voltage can be increased. Moreover, in each of Experimental Examples 1 and 2, it was speculated that the negative-electrode active material is structurally and thermally stable compared with metallic Si serving as a negative-electrode active material, thus resulting in superior charge-discharge cycle characteristics. These results demonstrated that the layered structural body in the present invention (crystalline organic-inorganic composite material) can be used as an electrode active material having excellent charge-discharge cycle characteristics.

TABLE 1

| | Compound | Oxidation capacity[1] $Q(1st)_{oxi}$ mAh/g | Plateau potential[2] V vs. Li/Li$^+$ |
|---|---|---|---|
| Experimental example 1 | Lithium 2,6-naphthalenedicarboxylate | 223 | 0.75 |
| Experimental example 2 | Lithium 4,4'-biphenyldicaroxylate | 227 | 0.70 |
| Experimental example 3 | Lithium terephthalate | 121 | 0.84 |
| Experimental example 4 | Lithium 2,3-naphthalenedicarboxylate | 140 | — |

[1]$Q(1st)_{oxi}$: The first reduction capacity in the charge-discharge operation
[2]Plateau potential: Constant potential in case of charge in the charge-discharge operation Next, properties of negative electrodes for lithium secondary batteries were studied, each of the negative electrodes including a layered structural body, a fibrous conductive material, a granular conductive material, and a binder material. Lithium secondary batteries each including the layered structural body prepared in Experimental Example 1 were produced. The results of studies on the charge-discharge characteristics of the batteries will be described in examples.

Example 1

A negative electrode for a lithium secondary battery was produced, the negative electrode including a layered structural body (negative-electrode active material) composed of lithium 2,6-naphthalenedicarboxylate (see chemical formula (7)) which was prepared in Experimental Example 1 and which had a specific surface area of 1.0 m$^2$/g and an average particle size of 2.5 μm. First, 60% by mass of the powdery negative-electrode active material, 10% by mass of a fibrous conductive material, such as vapor-grown carbon fibers (VGCFs), having a specific surface area of 13 m$^2$/g and an average fiber length of 15 μm, 20% by mass of a granular conductive material, such as carbon black, having a specific surface area of 225 m$^2$/g and an average particle size of 25 nm, and 10% by mass of polyvinylidene fluoride serving as a binder material were mixed together. An appropriate amount of N-methyl-2-pyrrolidone serving as a dispersant was added and dispersed therein, resulting in a slurry-like negative electrode mixture. The slurry-like negative electrode mixture was uniformly applied to a copper foil collector having a thickness of 10 μm and dried by heating to form a coated sheet. The coated sheet was then pressed and punched to prepare a disk-like electrode having an area of 2.05 cm$^2$. Furthermore, a two-electrode evaluation cell was produced by the same process as in Experimental Example 1 described above. The resulting cell was defined as one produced in Experimental Example 1.

Examples 2 to 7

A two-electrode evaluation cell was produced by the same process as in Example 1, except that the negative-electrode active material content, the fibrous conductive material content, the granular conductive material content, and the binder material content were 66.7% by mass, 11.1% by mass, 11.1% by mass, and 11.1% by mass, respectively. The resulting cell was defined as one produced in Example 2. A two-electrode evaluation cell was produced by the same process as in Example 1, except that the negative-electrode active material content, the fibrous conductive material content, the granular conductive material content, and the binder material content were 70.5% by mass, 5.9% by mass, 11.8% by mass, and 11.8% by mass, respectively. The resulting cell was defined as one produced in Example 3. A two-electrode evaluation cell was produced by the same process as in Example 1, except that the negative-electrode active material content, the fibrous conductive material content, the granular conductive material content, and the binder material content were 70.5% by mass, 11.8% by mass, 5.9% by mass, and 11.8% by mass, respectively. The resulting cell was defined as one produced in Example 4. A two-electrode evaluation cell was produced by the same process as in Example 1, except that the negative-electrode active material content, the fibrous conductive material content, the granular conductive material content, and the binder material content were 70.5% by mass, 11.8% by mass, 11.8% by mass, and 5.9% by mass, respectively. The resulting cell was defined as one produced in Example 5. A two-electrode evaluation cell was produced by the same process as in Example 1, except that the negative-electrode active material content, the fibrous conductive material content, the granular conductive material content, and the binder material content were 75.0% by mass, 12.4% by mass, 6.3% by mass, and 6.3% by mass, respectively. The resulting cell was defined as one produced in Example 6. A two-electrode evaluation cell was produced by the same process as in Example 1, except that the negative-electrode active material content, the fibrous conductive material content, the granular conductive material content, and the binder material content were 79.9% by mass, 6.7% by mass, 6.7% by mass, and 6.7% by mass, respectively. The resulting cell was defined as one produced in Example 7.

Comparative Examples 1 to 4

A two-electrode evaluation cell was produced by the same process as in Example 1, except that the negative-electrode active material content, the fibrous conductive material content, the granular conductive material content, and the binder material content were 85.0% by mass, 0.0% by mass, 10.0% by mass, and 5.0% by mass, respectively. The resulting cell was defined as one produced in Comparative Example 1. A two-electrode evaluation cell was produced by the same process as in Example 1, except that the negative-electrode active material content, the fibrous conductive material content, the granular conductive material content, and the binder material content were 60.0% by mass, 0.0% by mass, 30.0% by mass, and 10.0% by mass, respectively. The resulting cell was defined as one produced in Comparative Example 2. A two-electrode evaluation cell was produced by the same process as in Example 1, except that the negative-electrode active material content, the fibrous conductive material content, the granular conductive material content, and the binder material content were 75.0% by mass, 12.5% by mass, 0.0% by mass, and 12.5% by mass, respectively. The resulting cell was defined as one produced in Comparative Example 3. A two-electrode evaluation cell was produced by the same process as in Example 1, except that the negative-electrode active material content, the fibrous conductive material content, the granular conductive material content, and the binder material content were 78.9% by mass, 6.6% by mass, 1.3% by mass, and 13.2% by mass, respectively. The resulting cell was defined as one produced in Comparative Example 4.

(Charge-Discharge Test)

Figure 5:
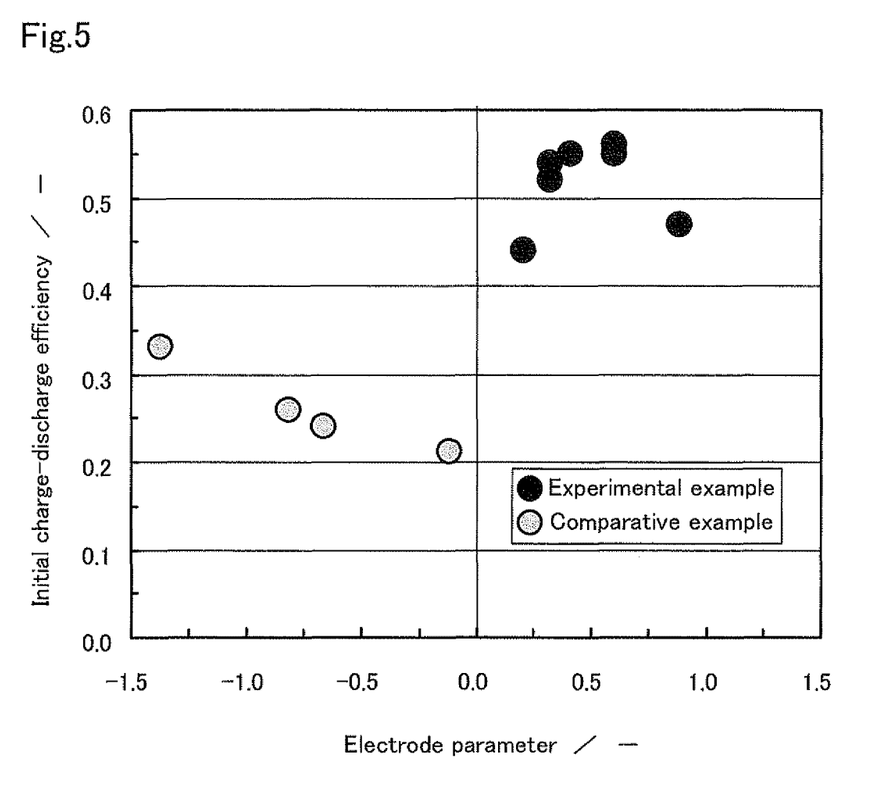
FIG. 5 is a graph illustrating the relationship between the electrode parameter value and the initial charge-discharge efficiency.

At 20° C., each of the two-electrode evaluation cells produced in Examples 1 to 7 and Comparative Examples 1 to 4 was reduced (charged) to 0.5 V at 0.02 mA and then oxidized (discharged) to 3.0 V at 0.02 mA. In the charge-discharge operation, the first reduction capacity was defined as $Q(1st)_{red}$, and the first oxidation capacity was defined as $Q(1st)_{oxi}$. The initial charge-discharge efficiency was determined by dividing the discharge capacity by the charge capacity. The electrode parameter was calculated using the specific surface area Sx (m$^2$/g), the average particle size Lx (μm), and the proportion X of the layered structural body, the specific surface area Sy (m$^2$/g), the average length Ly (μm), and the proportion Y of the fibrous conductive material, the specific surface area Sz (m$^2$/g), the average particle size Lz (μm), and the proportion Z of the granular conductive material, and expression (1). Table 2 summarizes the results of the charge-discharge test of the two-electrode evaluation cells produced in Examples 1 to 7 and Comparative Examples 1 to 4. FIG. 5 is a graph illustrating the relationship between the electrode parameter value and the initial charge-discharge efficiency. As shown in Table 2, in each of the cells produced in Comparative Examples 1 and 2, in which only the granular conductive material was added, and in Comparative Example 3, in which only the fibrous conductive material was added, the electrode parameter was less than zero, and the initial efficiency was low. In Comparative Examples 1 and 2, an increase in the amount of the granular conductive material added increased the initial discharge capacity. However, the initial charge-discharge efficiency was low. This is presumably because while a larger area of contact between the active material and the conductive material improves the electron-collecting function, the electron-conducting function is low. In Comparative Example 3, it was speculated that while the electron-conducting function was provided, the electron-collecting function was low, so that the initial discharge capacity and the initial charge-discharge efficiency were low. In Comparative Example 4, although the granular conductive material and the fibrous conductive material were contained, the electrode parameter was less than zero, and the initial discharge capacity and the initial charge-discharge efficiency were low. In contrast, in each of Examples 1 to 7, in which the electron-collecting function and the electron-conducting function were enhanced, the electrode parameter was zero or more, and the initial charge-discharge efficiency was high. The results demonstrated that when the electrode parameter value represented in expression (1) is zero or more, it is possible to design an electrode that enhances the initial charge-discharge characteristics of a lithium secondary battery including the layered structural body composed of the negative-electrode active material.

TABLE 2

| | Compounding ratio/ Parts by mass | | | | | Initial | Initial |
| --- | --- | --- | --- | --- | --- | --- | --- |
| | Active material | Fibrous conductive material | Granular conductive material | Bonding material | Electrode[1] parameter | discharge capacity mAh/g | charge-discharge efficiency |
| Example 1 | 60.0 | 10.0 | 20.0 | 10.0 | 0.889 | 141.5 | 0.47 |
| Example 2 | 66.7 | 11.1 | 11.1 | 11.1 | 0.599 | 167.6 | 0.56 |
| Example 3 | 70.5 | 5.9 | 11.8 | 11.8 | 0.411 | 158.8 | 0.55 |
| Example 4 | 70.5 | 11.8 | 5.9 | 11.8 | 0.321 | 110.6 | 0.52 |
| Example 5 | 70.5 | 11.8 | 11.8 | 5.9 | 0.599 | 154.9 | 0.55 |
| Example 6 | 75.0 | 12.4 | 6.3 | 6.3 | 0.321 | 114.6 | 0.54 |
| Example 7 | 79.9 | 6.7 | 6.7 | 6.7 | 0.208 | 90.4 | 0.44 |
| Comparative example 1 | 85.0 | 0.0 | 10.0 | 5.0 | −0.816 | 54.0 | 0.26 |
| Comparative example 2 | 60.0 | 0.0 | 30.0 | 10.0 | −1.368 | 136.1 | 0.33 |
| Comparative example 3 | 75.0 | 12.5 | 0.0 | 12.5 | −0.664 | 8.2 | 0.24 |
| Comparative example 4 | 78.9 | 6.6 | 1.3 | 13.2 | −0.221 | 96.1 | 0.21 |

[1]Electrode parameter = $\log((SyY + SzZ)/SxX \times 10^{-1}) \times \log((LyY + LzZ)/LxX \times 10^{1})$ Negative electrode active material: X (mass %), Specific surface area Sx (m$^2$/g), Average particle size Lx (μm) Fibrous conductive material: Y (mass %), Specific surface area Sy (m$^2$/g), Average length Ly (μm) Granular conductive material: Z (mass %), Specific surface area Sz (m$^2$/g), Average particle size Lz (μm) Bonding material: 100 − X − Y − Z (mass %)

INDUSTRIAL APPLICABILITY

The present invention can be used in battery industry.

What is claimed is:

1. A negative electrode for a lithium secondary battery, comprising:
   a negative-electrode mixture, comprising:
      a binder material;
      a negative-electrode active material being a layered structural body that includes an organic framework layer and an alkali metal element layer, the organic framework layer containing an aromatic compound that has a structure with two or more aromatic rings, the aromatic compound being in the form of dicarboxylate anions, the alkali metal element layer containing an alkali metal element that is coordinated with oxygen in the carboxylate anions to form a framework, and the negative-electrode active material having a specific surface area of Sx ($m^2/g$) and an average particle size of Lx (μm);
      a fibrous conductive material having a specific surface area of Sy ($m^2/g$) and an average length of Ly (μm); and
      a granular conductive material having a specific surface area of Sz ($m^2/g$) and an average particle size of Lz (μm),
   wherein:
      letting the negative-electrode active material content be X, letting the fibrous conductive material content be Y, and letting the granular conductive material content be Z, $\text{Log}((SyY+SzZ)/SxX \times 10^{-1}) \times \text{Log}((LyY+LzZ)/LxX \times 10^{1})$ is defined as an electrode parameter, and the electrode parameter satisfies expression (1):

$$\text{Log}((SyY+SzZ)/SxX \times 10^{-1}) \times \text{Log}((LyY+LzZ)/LxX \times 10^{1}) \geq 0 \qquad \text{expression (1);}$$

X is from 50 parts by mass to 80 parts by mass with resect to 100 parts by mass of the total negative-electrode mixture;
   Sx is from 0.1 $m^2/g$ to 10 $m^2/g$;
   Lx is from 0.5 μm to 20 μm;
   Y is from 5 parts by mass to 15 parts by mass with respect to 100 parts by mass of the total negative-electrode mixture;
   Sy is from 1 $m^2/g$ to 100 $m^2/g$;
   Ly is from 5 μm to 100 μm;
   Z is from 5 parts by mass to 15 parts by mass with respect to 100 parts by mass of the total negative-electrode mixture;
   Sz is from 10 $m^2/g$ to 500 $m^2/g$; and
   Lz is from 0.005 μm to 5 μm.

2. The negative electrode for a lithium secondary battery according to claim 1, wherein the layered structural body is formed by the π-electron interaction of the aromatic compound and has a monoclinic crystal structure assigned to space group $P2_1/c$.

3. The negative electrode for a lithium secondary battery according to claim 1, wherein the layered structural body has a structure in which the alkali metal element is four-coordinated with four oxygen atoms of different dicarboxylate anions, the structure being represented by chemical formula (1):

[Chem. 1]

Chemical formula (1)

wherein:
   each R independently represents a structure with two or more aromatic rings; and
   A represents an alkali metal element.

4. The negative electrode for a lithium secondary battery according to claim 1, wherein the organic framework layer contains an aromatic compound having a structure represented by chemical formula (2):

[Chem. 2]

Chemical formula (2)

wherein R represents a structure having two or more aromatic rings.

5. The negative electrode for a lithium secondary battery according to claim 1, wherein the organic framework layer contains one or more aromatic compounds represented by chemical formulae (3) to (5):

[Chem. 3]

Chemical formula (3)

Chemical formula (4)

Chemical formula (5)

wherein:

n represents an integer of 2 to 5;

m represents an integer of 0 to 3; and each of the aromatic compounds may have a substituent or a heteroatom in its structure.

6. The negative electrode for a lithium secondary battery according to claim 1, wherein:

the organic framework layer contains the aromatic compound, and one of the dicarboxylate anions and the other are bonded in diagonal positions of the structure with the aromatic rings.

7. The negative electrode for a lithium secondary battery according to claim 1, wherein the alkali metal element contained in the alkali metal element layer is Li.

8. A lithium secondary battery comprising:

a positive electrode;

the negative electrode for a lithium secondary battery according to claim 1; and an ion-conducting medium that conducts lithium ions.

9. A negative electrode for a lithium secondary battery, comprising:

a negative-electrode active material having a layered structural body that includes an organic framework layer and an alkali metal element layer, the organic framework layer containing an aromatic compound that has a structure with two or more aromatic rings, the aromatic compound being in the form of dicarboxylate anions, the alkali metal element layer containing an alkali metal element that is coordinated with oxygen in the carboxylate anions to form a framework;

a fibrous conductive material; and a granular conductive material.

* * * * *